US007346537B2

(12) United States Patent
Kraft et al.

(10) Patent No.: US 7,346,537 B2
(45) Date of Patent: Mar. 18, 2008

(54) BUSINESS METHOD OF PROVIDING A CHANNEL FOR DELIVERING AND DISTRIBUTING EVENTS BASED ON A SUBSCRIPTION MODEL FOR SERVICE PROVIDERS TO ENHANCE SALES OPPORTUNITIES

(75) Inventors: Reiner Kraft, Gilroy, CA (US); Joann Ruvolo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1201 days.

(21) Appl. No.: 09/863,268

(22) Filed: May 24, 2001

(65) Prior Publication Data

US 2002/0178045 A1 Nov. 28, 2002

(51) Int. Cl.
*G06F 17/30* (2006.01)
(52) U.S. Cl. ...................................................... 705/10
(58) Field of Classification Search .................. 705/10, 705/9; 707/104.1
See application file for complete search history.

(56) References Cited

U.S. PATENT DOCUMENTS

| 6,236,977 B1* | 5/2001 | Verba et al. ................... 705/10 |
| 6,314,361 B1* | 11/2001 | Yu et al. ...................... 701/120 |
| 6,334,133 B1* | 12/2001 | Thompson et al. ......... 707/104.1 |
| 6,675,151 B1* | 1/2004 | Thompson et al. ............. 705/9 |
| 6,732,080 B1* | 5/2004 | Blants ............................. 705/9 |
| 6,842,737 B1* | 1/2005 | Stiles et al. ..................... 705/6 |
| 2002/0016723 A1* | 2/2002 | Matsui et al. ................... 705/6 |

FOREIGN PATENT DOCUMENTS

WO    WO9938125 A1 *  7/1999

OTHER PUBLICATIONS

Green, Jeff. "Forward Motion: OnStar Exits GM's Garage en Route to Independence". Brandweek. Apr. 10, 2000. vol. 41, Issue 15. p. 18.*
English, Robert. "Locked in Your Car? You Can Choose Who Helps You In And Out Of Your Jam" National Post. Sep. 24, 1999. p. E8.*
Thompson, Jim. "High-tech Hits the Highway". Boardwatch. Jan. 2001. vol. 15, Issue 1. p. 28.*
McDonald, Maureen. "Traveling Technicians Offer Roadside Help". May 7, 2001. vol. 75, Issue 5928. p. 20.*
Chuan, Yeoh OOn. "Free Roadside Help for Nissan Owners". Malay Mail. Jul. 12, 2000. p. 22.*
"OnStar In Action". OnStar Corporation. <http://www.onstar.com>.*

* cited by examiner

*Primary Examiner*—Tariq R. Hafiz
*Assistant Examiner*—Peter Choi
(74) *Attorney, Agent, or Firm*—IP Authority, LLC; Ramraj Soundararajan (57) ABSTRACT

Sales associated with service providers are increased using an opportunistic approach based on an unexpected change in a schedule or services (time, location). Windows of opportunity (time, physical location) are automatically identified, and once such a window of opportunity is detected, the people affected directly from the change of a schedule are identified. This information is then used by service providers to act quickly in order to enhance sales. Both service providers and consumers setup a personalized profile in a database, and the system uses a matching process to match related service providers to the consumers' preferences.

28 Claims, 5 Drawing Sheets

BUSINESS METHOD OF PROVIDING A CHANNEL FOR DELIVERING AND DISTRIBUTING EVENTS BASED ON A SUBSCRIPTION MODEL FOR SERVICE PROVIDERS TO ENHANCE SALES OPPORTUNITIES

RELATED APPLICATIONS

The present application is related to co-pending application Ser. No. 09/768,458 filed on Jan. 25, 2001, entitled "Enhancing Sales for Service Providers by Utilizing an Opportunistic Approach Based on an Unexpected Change in Schedule of Services (time, location)," assigned to the same assignee as the present application, which is incorporated herein by reference.

BACKGROUND OF THE INVENTION

1. Field of Invention

The present invention relates generally to the field of electronic commerce. More specifically, the present invention is related to enhancing sales for service providers by utilizing an opportunistic e-commerce approach based on an unexpected change in the schedule of services (time, location).

2. Discussion of Prior Art

There has been a steady increase in the speed and ease with which business transactions are carried over a network such as, but not limited to, wide area networks (WANs), local area networks (LAN's), or the World Wide Web (WWW). Systems based on networks listed above deal with a plethora of information available in various formats (e.g., documents, images, sounds, etc.) A significant focus in recent e-commerce activities revolves around optimization solutions with the end-user as the center of the focus. One common challenge associated with such e-commerce systems is whether or not they are able to filter out relevant or pertinent information that benefits the end-user. Many filtering techniques utilize data extraction as a method to filter out unnecessary documents (or data) and provide only relevant or pertinent information that is beneficial from the end-user's perspective. Data extraction is accomplished in many systems via a method often referred to as data mining.

Data mining involves a class of database applications that look for hidden patterns in a data set. For example, data mining software helps retail companies find customers with common interests. Data mining is commonly misused to describe software that presents data in new ways. True data mining software does not just change the presentation, but discovers previously unknown relationships among the data. In data mining, data is usually collected at the server-side, client-side, proxy servers, or obtained from a database.

Data extracted via data mining fall under many different categories, one common category being web pages that are accessed by end-users via an interface (e.g., browsers like Netscape Navigators® or Internet Explorers®). In general, web pages usually contain, but are not limited to, textual and/or graphical data. One common problem associated with data extracted from web pages is that there is no standard format associated with this data. This is a significant problem encountered by data mining software, since in most cases it is not able to analyze the extracted data in a logical way.

If used to its full advantage, this data can be automatically retrieved and processed for use in business intelligence and various other purposes. For example, data mining used for transportation schedules and tracking can benefit both the traveler (consumer) and business (sales provider). When used along with the advent of personal digital assistants (PDA's) with network connectivity (more specifically Internet connectivity), cellular web telephones with integrated global positioning service (GPS) receivers, etc., there are new opportunities to enhance marketing communication and resulting sales.

Although personalized advertising and direct marketing are becoming more sophisticated through the use of data mining software programs, current advertising and marketing strategies do not enjoy all the benefits from new emerging Internet and e-commerce applications and technologies. Furthermore, none of the prior art systems utilize an opportunistic approach based on an unexpected change in the schedule of services (time, location) with Internet-based technologies to benefit and enhance the generation of sales opportunities for sales providers.

SUMMARY OF THE INVENTION

The present invention provides for a system and a method for enhancing sales for service providers by utilizing an opportunistic approach based on an unexpected change in a schedule or services (time, location). The system of the present invention automatically identifies windows of opportunity (time, physical location), and once such a window of opportunity is detected, the system determines whether people are affected directly from the change of a schedule. This information is then used by service providers to act quickly in order to enhance sales. Heuristics to determine a window of opportunity are based only on schedule changes, which are associated with a rule database. Thus, the present system utilizes network-based technologies and communications to generate or increase additional sales for service providers.

Service providers setup a personalized profile in a database, with a profile manager that allows customizing and managing of profile data. By analyzing an incoming event based on a channel rules database and making a decision with a distribution channel analyzer, the system uses a matching process, or event matcher, to match related service providers to the identified window of opportunity based on location, accessibility, kind of services, or other specified criteria. An accounting manager keeps track of all business transactions. All events along with additional data, e.g. accounting data and generated sales, are stored in an event database to be used for determination of sufficient sales providers in future windows of opportunity.

Furthermore, in an additional embodiment, consumers also setup a user profile that is used to build rules to maximize personalization experience. A consumer database contains the additional data of the users. In an additional embodiment, a profile manager allows consumers to manage profile data.

In an additional embodiment, institutions/organizations also set up a profile to build rules for selection of service providers. An institutional/organizational database contains additional data of institutions and organizations that generate events. In an additional embodiment, a profile manager allows institutions/organizations to manage profile data.

In a final embodiment, a location tracker is utilized to keep track of subscribed consumers. A location tracker, such as a GPS system or cellular phone, is carried by a consumer and transmits location data continuously to the location tracker so that when an event occurs the subscribed consumer has a more personalized experience.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

One fundamental aspect of the present invention is to determine a so-called "window of opportunity". An example of determining a window of opportunity is an unexpected change in schedule of public services. For example, consider a train, which is scheduled to leave at 7:00 AM, but due to unknown circumstances the schedule is changed to 7:45 AM. There is a good chance that there are people who use this train to commute to work, and were not informed in time about this unexpected schedule change event. Most of these people probably will decide to wait there until 7:45 AM, instead of investigating alternatives. But, it would be desirable to have a system, which would identify these unexpected events as "window of opportunities." This identified information is then used by service providers to deliver useful services to these waiting people in order to help them satisfy their demands or utilize their blocked time. Hence, service providers like food delivery services, newspaper delivery services, taxicab services, etc., utilize a opportunistic approach to deliver useful services for these waiting people in order to help them satisfy demands (e.g., deliver food) or utilize their blocked time (e.g., sell a magazine, provide entertainment, etc.)

Once a window of opportunity event is identified, it will be automatically classified into sales and service channels. The location (area) is determined, along with a starting time (and an estimated duration time). The question of how to utilize this new information is raised in order to:

a) help people adjacent or nearby the window of opportunity event to facilitate the consumption of acquiring goods or services b) enhance sales of retailers or service providers by leveraging the information of a window of opportunity event to target an area around the physical location of this event at a specific time.

By targeting service providers that satisfy the needs of the consumers, customer service and sales figures will increase. In order to achieve this, data must be acquired to aid in the selection process. The organization or institution that is responsible for creating the window of opportunity event might provide additional data to estimate better upcoming sales opportunities. For instance, knowing that a particular train at a specific time carries a certain number of people helps estimate the number of people who might be interested in purchasing goods or services, as well as helps service providers anticipate and estimate the revenue that a particular window of opportunity might generate. This in turn will help service providers in the decision process when deciding whether to accept an incoming window of opportunity event. For instance, a train running late around midnight might carry only a few people. The window of opportunity event generated through the delay of this train might not be attractive to a service provider, since it will most likely not lead to enough sales in order to generate a positive cash flow. Thus, the service provider might choose to decline the offered window of opportunity events. Furthermore, the organization or institution that is causing the event might provide this information on a voluntary basis, helping perform the estimate, or the invention would need to automatically extract it from public sources and databases (e.g., using existing crawling and data mining technologies).

In one embodiment, retail and service providers supply a business profile (e.g., kind of services or goods they offer, delivery radius, pricing, etc.) to the system as described in further detail below. In a variation of this embodiment, consumers setup a personalized user profile comprising preferences, etc. This information is used to build rules to maximize the personalization experience. For instance, if a person misses a train, they might prefer to read special literature or prefer vegetarian food instead of meat, etc. This provides both an advantage to service providers and customers. Having a service provider automatically taking care of some of the customers needs might help soothe the feelings of the customers when confronted with the delay.

A continuous matching process for each window of opportunity event is provided, such that the system matches the service providers to the consumers in various ways. One example is to maximize a service provider's sales. The system, however, is open to other matching strategies, without departing from the spirit and scope of the present invention.

The mentioned window of opportunity events, in another embodiment, overlap in terms of location and/or time. Such adjacent window of opportunity events are investigated to see whether combining the events based on a defined strategy will provide the best solution. For instance, two different events, around the same physical location, with a ten minute delay, might be of interest to the same service provider. In such a case, the second event could be added to the first one based on various criteria.

Using the train example from above, the invention will now be illustrated. A window of opportunity event is identified by a system. The invention then determines service providers who are potentially interested in this event, and notifies the service providers accordingly with the event, location, time, etc. Some service providers are interested in having exclusive coverage for a particular event type or location to gain a competitive advantage. As in the train example, three hot dog providers within the area of the event may be a match. However, hot dog provider A paid extra to have exclusive rights in a particular geographic area. This hot dog provider would then receive a notification about the newly discovered window of opportunity event, while the others are notified at a later time, or not at all. This information is then used to perform sales activities in the area of the identified window of opportunity. A matching algorithm will try to optimize the chances of enhancing sales by obtaining good matches. Any known or available matching algorithm can be used; in the present invention, however, for a good match to be obtained the algorithm has to consider:

a) the location of the event in relation to the service area of providers    b) the (estimated) duration of the event in relation to time a service provider is able to start providing services in the area    c) the type of event in relation to the type of services matched.

Additional criteria may also be used for the matching algorithm to overall enhance the possibility of sales associated with the window of opportunity event.

In addition, the system utilizes a subscription management service. Users are able to subscribe to the service and choose their preferences in order to improve the service provider selection process. Those that are adjacent or nearby a window of opportunity event can also be identified, for example, by carrying a location-tracking device (e.g. GPS), which is connected to a centralized real-time tracking database. This optional information would be obtained from a location based tracking system.

The present invention will make use of the identified "window of opportunities" as fully described in the related application "Enhancing Sales for Service Providers by Utilizing an Opportunistic Approach Based on an Unexpected Change in Schedule of Services" and introduce a new business process to leverage the produced window of opportunity events in order to associate them with distribution channels (service providers) by integrating users preferences.

Figure 1:
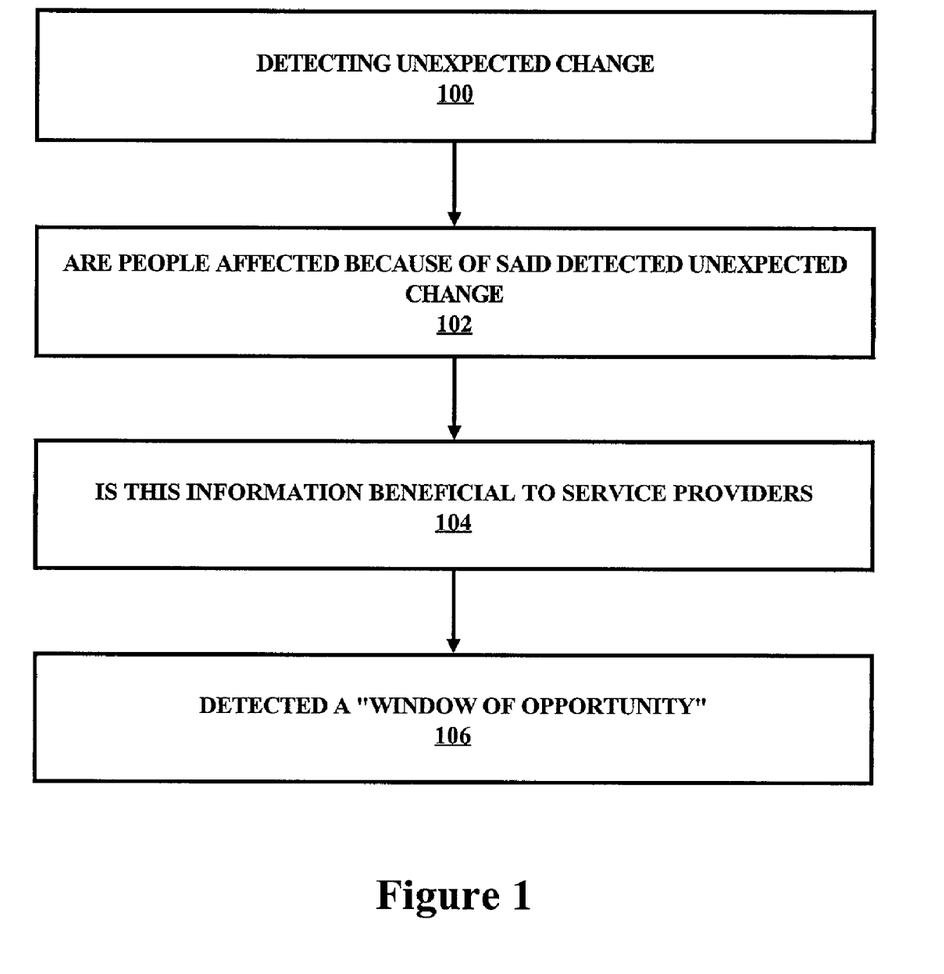
FIG. 1 illustrates a general method of obtaining a window of opportunity.

FIG. 1 generally illustrates the method of obtaining a "window of opportunity". First the invention detects any unexpected change in schedules 100. Next, the system determines whether or not the people are affected by said detected change 102. If the people are affected, then the system determines if this information is beneficial to any service provider 104. The system detects and identifies a "window of opportunity" 106 if the information is in fact beneficial to at least one service provider.

Once such a window is detected, there are several possibilities. First, in a preferred embodiment, the invention will determine what type of service provider might benefit from this information. Second, the invention might determine whether people are affected directly from the change of schedule. This information is then used by these service providers to act quickly in order to enhance sales. The heuristics to determine a window of opportunity are only based on schedule changes, which are associated with a rules database.

Figure 2:
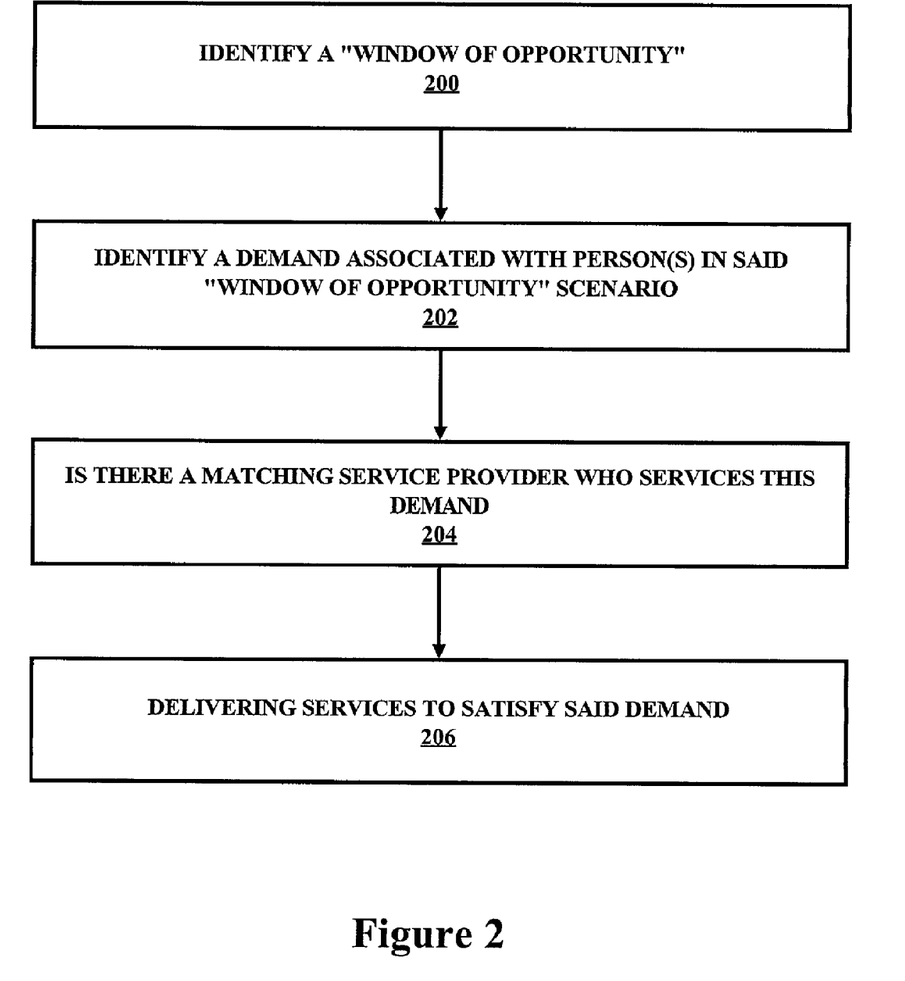
FIG. 2 illustrates a general method of obtaining a suitable service provider once a window of opportunity is identified.

FIG. 2 illustrates an overview of the process of finding a suitable service provider when an unexpected schedule change occurs. After identifying a "window of opportunity" 200, the system identifies a demand 202 associated with the persons affected by the "window of opportunity." This identified demand 202 is generally found through the use of a consumer profile database, which will be discussed in further detail below. Next, the system matches service providers 204 that satisfy this demand by searching through a service provider profile database, also discussed in further detail below. If a match is found, the services are delivered to satisfy the demand 206.

Hence, the present invention provides a very valuable framework for detecting "windows of opportunities" and using stored database information for the satisfaction of customers for finding sufficient service providers. By utilizing emerging Internet technologies, and providing a basis for service providers to take advantage of these opportunities, the production of additional sales will increase.

Figure 3:
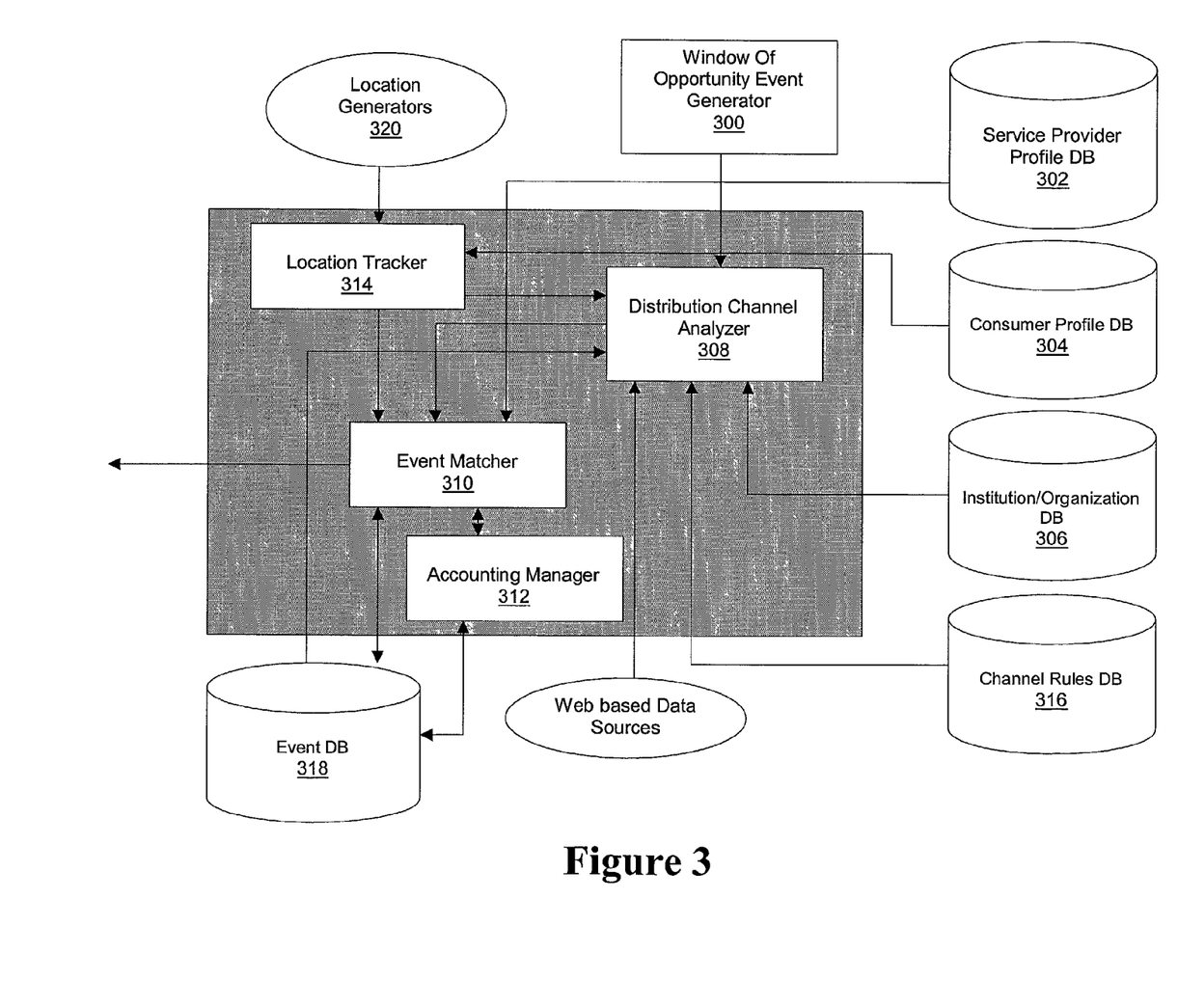
FIG. 3 illustrates a preferred embodiment of the invention for enhancing sales for service providers by utilizing a window of opportunity and stored profile information in a database.

FIG. 3 illustrates the preferred embodiment of the system of the present invention, which comprises:

a) Window of Opportunity Event Generator 300

Window of opportunity event generator 300 originates an event and identifies the starting time and (estimated) duration time of the event.

b) Service Provider Profile DB 302

This database contains data of service providers, and is used by Event Matcher 310.

Service Providers and retailers provide information such as services and goods for Event       Matcher 310 to analyze when an event occurs.

c) Consumer Profile DB (optional) 304

This optional database contains additional data of consumers/users. Data such as the preferences (likes and dislikes) of the consumers is stored here.

d) Institution/Organization DB (optional) 306

This optional data contains additional data of institutions and organizations that generate events. Examples of an institution or organization are airline companies that publish a schedule for flights online.

e) Distribution Channel Analyzer 308

One key functionality of Distribution Channel Analyzer 308 is to estimate the probability of sales. Distribution Channel Analyzer 308 receives an event and analyzes it based on a set of criteria and rules. Rules are obtained from Channel Rules DB 316. Additional data is obtained from Institution/Organization DB 306, if available, or gathered automatically from the Internet using public sources of information. Distribution Channel Analyzer 308 analyzes the incoming event and the additional data by applying rules to make some decision about the event. Events are all stored in Event DB 318, which can also be used for forming a decision. For instance, based on some history data from Event DB 318, an event is dropped if there is a rule that the identified event was already dispatched on the same day, or the identified event did not produce enough sales at previous times. The likelihood of producing more sales is not high enough, so the analyzer 308 makes the decision not to pursue matching a service provider with the event.

For example, an event (A) from an airline is received stating a particular flight will have a delay of 15 minutes; a similar event (B) was received a week ago with a similar delay period. Event (B) was forwarded as a window of opportunity where rules were applied to that event, and led only to marginal sales for the service providers. Similarly, the current event (A) is forwarded as a window of opportunity. Based on the previous experience, event (B), it is assumed that the probability to generate high sales is unlikely, and, therefore, the event is dropped.

f) Service Provider Profile Manager

This Profile Manager component allows customizing and managing profile data. For simplicity it is not shown in the system architecture.

g) Consumer Profile Manager (optional)

This Profile Manager component allows customizing and managing profile data. For simplicity it is not shown in the system architecture.

h) Institution/Organization Profile Manager (optional)

This Profile Manager component allows customizing and managing profile data. For simplicity it is not shown in the system architecture.

i) Event Matcher 310

Event Matcher 310 receives an analyzed event from Distribution Analyzer component 308. It then looks for appropriate sales and distribution channels, while integrating consumer data from previous events and the location of possible consumers from Location Tracker 314 (if available). Service Provider Profile Database 302 provides appropriate retailers and providers. An event notification is sent to the selected service provider. This service provider then accepts or declines the task of servicing the event. Feedback of how the event was serviced, originated sales, etc. is also obtained from the service provider and stored in Event DB 318, so that future events can leverage this information.

j) Accounting Manager 312

This component provides accounting functionality. For instance, the system will charge commission fees for the distribution of events. Accounting Manager 312 keeps track of all business transactions.

k) Location Tracker (optional) 314

This optional component keeps track of the location of subscribed consumers in a database. For instance, a consumer carries a Location Generator 320 such as a location tracking device (e.g. cellular phone, GPS positioning device), which transmits location data continuously to the location tracker.

l) Channel Rules DB 316

A database that contains rules which can be applied to particular channels.

m) Event DB 318

All events are stored in this database, along with additional data (e.g. accounting data, generated sales, etc.)

n) Location Generator 320

A location tracking device that correlates a subscribed consumer's location back to Location tracker 314.

Figure 4:
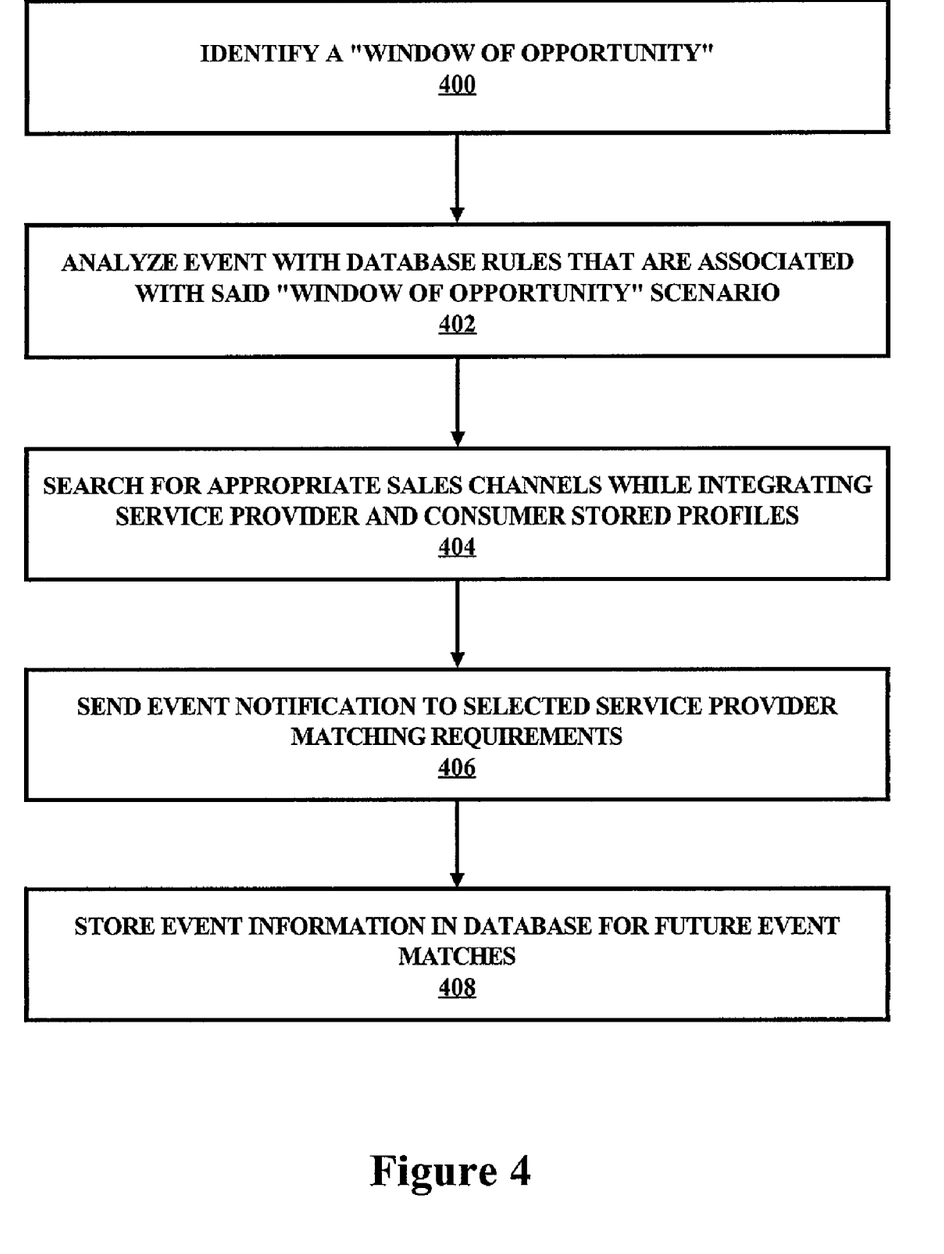
FIG. 4 illustrates a general method of the preferred embodiment.

FIG. 4 illustrates a general overview of the process of the preferred embodiment. After a window of opportunity is identified 400, the event is analyzed with the associated database rules 402. Appropriate sales channels are then searched 404 while integrating both service provider and consumer stored profiles (if applicable). An event notification is sent to the selected service provider matching the requirements needed 406, and event information is then stored in a database for future event matches 408.

Figure 5:
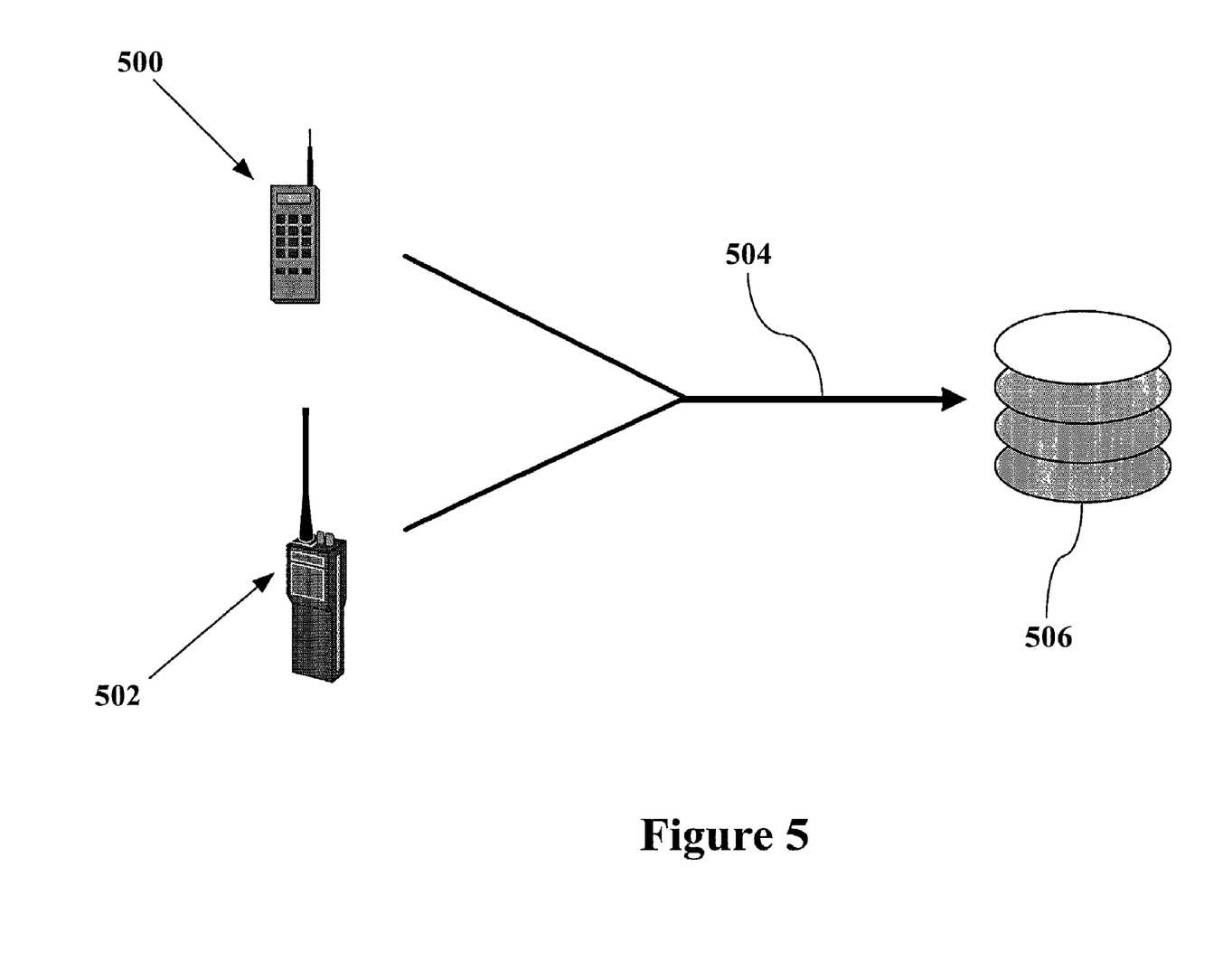
FIG. 5 illustrates an embodiment of the invention utilizing a location tracker.

FIG. 5 illustrates the use of a location tracker. A location tracking device, such as a cellular phone 500 or other GPS device 502, transmits location data 504 continuously to a location tracker database 506, where subscribed consumers' locations are maintained or found for use when an event occurs. Should a number of subscribed customers be present when an event takes place, the tracker 506 assists in determining the service provider for a more personalized experience.

CONCLUSION

A system and method has been shown in the above embodiments for the effective implementation of a business method of providing a channel for delivering and distributing events based on a subscription model for service providers to enhance sales opportunities. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, communications mediums, specific distribution channels, vendor types or subscription models.

The present invention may be implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database or rules-based programming.

The invention claimed is:

1. A computer-based system utilizing an event matching system for service providers, said system comprising:
a window of opportunity event generator,
said window of opportunity event generator automatically identifying an event,
said event comprising an unexpected period of inactivity when a scheduled activity is blocked;
a distribution channel analyzer,
said distribution channel analyzer analyzing said event to determine whether said event is likely to generate an increase in sales; and
an event matcher,
said event matcher receiving said event from said distribution channel analyzer if said distribution channel analyzer determines that said event is likely to generate said increase in sales, and
said event matcher selecting at least one of said service providers for said event from a service provider database.

2. A system according to claim 1, further comprising:
an accounting manager,
said accounting manager cooperating with said event matcher to provide an accounting functionality for said at least one of said service providers.

3. The system according to claim 2, wherein:
said database comprises a service provider profile database,
said service provider profile database containing informational data of said service providers.

4. The system according to claim 1, wherein:
said system further utilizes a service provider profile manager for said service provider database,
said service provider profile manager allowing service providers to customize and manage profile data in said service provider database.

5. The system according to claim 1, wherein:
said system further utilizes an event database,
said event database storing data relating to events for which a service provider is selected by said event matcher.

6. The system according to claim 1, wherein:
said distribution channel analyzer further utilizes a channel rules database containing rules to be applied to particular channels.

7. The system according to claim 1, wherein:
said distribution channel analyzer further utilizes data and rules obtained from an institutional or organizational database,
said institutional or organizational database containing additional informational data of selected institutions or organizations.

8. The system according to claim 7, wherein:
said data and rules of said distribution channel analyzer further utilize an institutional or organizational profile manager,
said manager allowing said selected institutions or organizations to customize and manage profile data in said database.

9. The system according to claim 1, wherein:
said system further comprises a subscription management service, wherein:
at least one said unexpected period of inactivity is defined for tracking.

10. The system according to claim 9, wherein:
said system further comprises a location tracker,
said tracker employed to keep track of subscribed consumers.

11. The system according to claim 10, wherein:
said location tracker further comprises a consumer profile database for storing consumers' informational data.

12. The system according to claim 11, wherein:
said location tracker further utilizes a consumer profile manager, wherein:
said manager allows consumers to customize and manage profile data in said database.

13. The system according to claim 10, wherein:
said system further comprises a tracking device used to transmit location data continuously to said location tracker.

14. The system according to claim 13, wherein:
said tracking device generates said location data from a source of positional data selected from the group consisting of:
a GPS receiver;
a cellular telephone; or
any other wireless system.

15. An e-commerce method for enhancing sales of service providers, said service providers in communication across networks and available to provide one or more specific services through directed sales to selected customers, said method comprising the steps of:
automatically detecting at least one sales opportunity based on an event, said event comprising at least one unexpected period of inactivity when a scheduled activity is blocked;
analyzing said at least one sales opportunity to determine whether said event provides a beneficial opportunity likely to generate an increase in sales;
matching said beneficial opportunity with information from a subscriber profile database to select one or more of said service providers as a selected service provider; and
notifying said selected service provider of said beneficial opportunity.

16. The method according to claim 15, further comprising the step of:
providing an accounting functionality for said one or more of said service providers by analyzing events and transactions of actual sales.

17. The method according to claim 15, wherein:
said step of matching said beneficial opportunity with information from a subscriber profile database further comprises using an external service provider profile database.

18. The method according to claim 17, further comprising the step of:
managing and customizing profiles of said service providers in said service provider profile database.

19. The method according to claim 15, further comprising the step of:
storing data of said events in an event database.

20. The method according to claim 15, further comprising the step of:
obtaining rules from a channel rules database to be applied to particular channels.

21. The method according to claim 15, further comprising the step of:
obtaining rules from an institutional/organizational profile database containing data of selected institutions or organizations in which events may take place.

22. The method according to claim 21, further comprising the step of:
managing and customizing profiles of institutions or organizations in said institutional/organizational profile database.

23. The method according to claim 15, further comprising the step of:
tracking schedules of subscribed consumers or said service providers.

24. The method according to claim 23, further comprising the step of:
utilizing a tracking device to keep track of the location of said subscribed consumers.

25. The method according to claim 24, wherein:
said tracking device generates said location data from a source of positional data selected from the group consisting of:
a GPS receiver;
a cellular telephone; or
any other wireless system.

26. The method according to claim 23, further comprising the step of:
storing a profile of at least one consumer in a consumer profile database.

27. The method according to claim 26, further comprising the step of:
managing and customizing said profile of said at least one consumer in said consumer profile database.

28. An article of manufacture comprising a computer program product, said computer program product comprising a computer readable medium storing processor-executable program code:
said computer readable program code embodying a method comprising the steps of:
automatically detecting at least one sales opportunity based on an event, said event comprising at least one unexpected period of inactivity when a scheduled activity is blocked;
analyzing said at least one sales opportunity to determine whether said event provides a beneficial opportunity likely to generate an increase in sales;
matching said beneficial opportunity with information from a subscriber profile database to select one or more of said service providers as a selected service provider; and
aiding in notifying said selected service provider of said beneficial opportunity.

* * * * *